US012603941B2

(12) United States Patent
Kuravangi-Thammaiah et al.

(10) Patent No.: US 12,603,941 B2
(45) Date of Patent: Apr. 14, 2026

(54) SYSTEM AND METHOD FOR SHARING UNIFIED DATA REPOSITORY WITH MANAGED NETWORK

(71) Applicant: Verizon Patent and Licensing Inc., Basking Ridge, NJ (US)

(72) Inventors: Shanthala Kuravangi-Thammaiah, Keller, TX (US); Kyriaki Konstantinou, New York, NY (US); Lalit R. Kotecha, San Ramon, CA (US); Lixia Yan, Basking Ridge, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 350 days.

(21) Appl. No.: 18/316,271

(22) Filed: May 12, 2023

(65) Prior Publication Data

US 2024/0380821 A1       Nov. 14, 2024

(51) Int. Cl.
*H04L 67/51* (2022.01)
*H04W 84/04* (2009.01)

(52) U.S. Cl.
CPC ........... *H04L 67/51* (2022.05); *H04W 84/042* (2013.01)

(58) Field of Classification Search
None
See application file for complete search history.

(56) References Cited

U.S. PATENT DOCUMENTS

2021/0298064 A1*   9/2021   Luo ........................ H04W 72/23
2023/0308998 A1*   9/2023   Kim ...................... H04W 48/16

* cited by examiner

*Primary Examiner* — Frantz Bataille

(57) ABSTRACT

A Unified Data Repository (UDR) may be included in a first network with a first Public Land Mobile Network (PLMN) identifier (ID). The UDR may include a resource that comprises data at a child node. The resource may have a name corresponding to a second PLMN ID. The UDR may include one or more processors configured to: receive a call, from a network function located in a second network with the second PLMN ID, to access the data; and send a response to the call.

20 Claims, 12 Drawing Sheets

Figure 2:
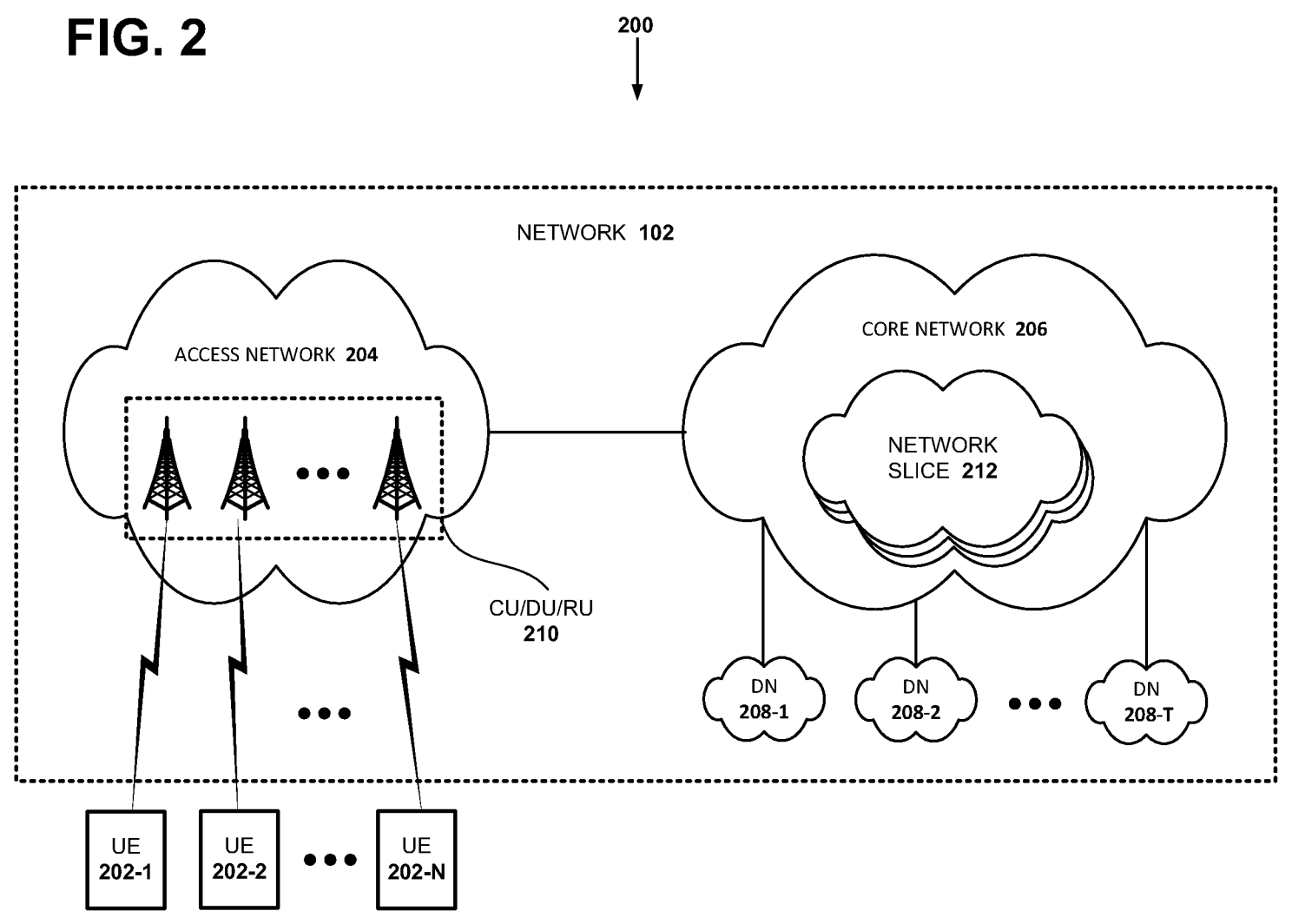

NETWORK 102

CORE NETWORK 206

NETWORK SLICE 212

DN 208-1

DN 208-2

DN 208-T

ACCESS NETWORK 204

CU/DU/RU 210

UE 202-1

UE 202-2

UE 202-N

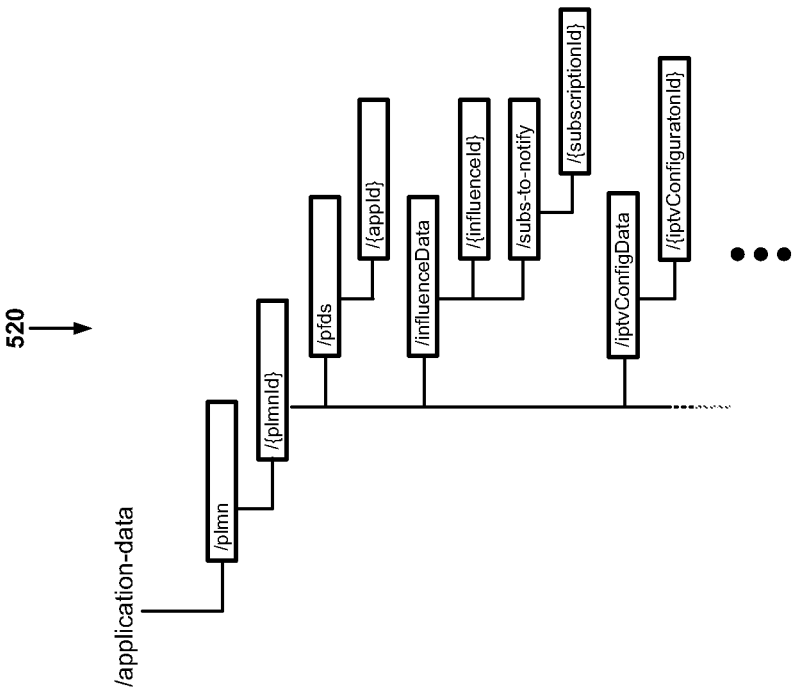
520 →
FIG. 5A
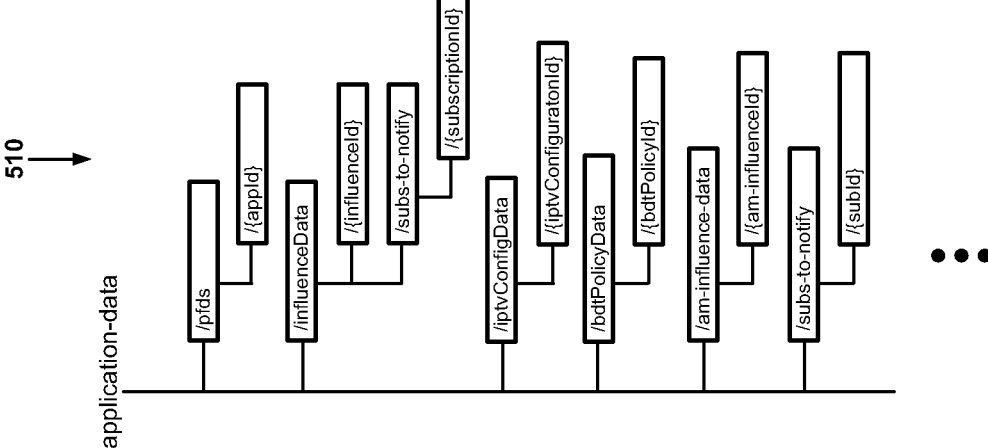
510 →

620 →

IDENTIFY DATA TO BE ACCESSED FROM UDR 622 → GENERATE URI 624 → SELECT API 626 → MAKE THE API CALL VIA NEF USING THE URI AND API NAME 628 → OBTAIN THE UDR RESPONSE VIA THE NEF 630

600 →

OBTAIN DATA 602 → GENERATE URI 604 → SELECT API 606 → CALL UDR VIA NEF USING THE DATA, API NAME, and URI 608 → OBTAIN THE UDR RESPONSE VIA THE NEF 610

650 →

DETERMINE PLMN ID OF THE MANAGED NETWORK 652

→

CONCATENATE "/PLMN" WITH A STRING VERSION OF THE PLMN ID 654

→

CONCATENATE THE FULL URI OF THE RESOURCE 656

SYSTEM AND METHOD FOR SHARING UNIFIED DATA REPOSITORY WITH MANAGED NETWORK

BACKGROUND INFORMATION

Fifth Generation (5G) networks implement their core network functions based on the Service Based Architecture (SBA). According to the SBA, each network function fulfills the role of a service producer and the role of a service consumer. When a network function assumes the role of a service consumer, the network function may receive a service from a producer; and vice versa. Network Functions are mostly self-contained, independent, and reusable. Each network function may expose its functionality to other network functions through a Service Based Interface (SBI), using Hypertext Transfer Protocol (HTTP)/2.

BRIEF DESCRIPTION OF THE DRAWINGS

FIG. 2 illustrates an exemplary network environment in which systems and methods for sharing a UDR with managed networks may be implemented;

FIGS. 5A and 5B illustrate example modifications to a UDR for sharing the UDR with managed networks, according to an implementation;

DETAILED DESCRIPTION

The following detailed description refers to the accompanying drawings. The same reference numbers in different drawings may identify the same or similar elements. As used herein, the term "managed network" may refer to a network that is managed by another network, herein referred to as a "managing network." A managing network may have different levels of control over managed networks, from complete control to no control. Both a managing network and a managed network may implement one or more features of a 5G network, such as features of Service Based Architecture (SBA). Examples of managed networks include a network slice, a virtual network (other than a network slice), a non-public network (NPN), a Network-as-a-Service (NaaS)

network; or a partner network. In some embodiments, a NaaS network may be implemented as a network slice.

Systems and methods described herein relate to sharing Unified Data Repository (UDR) of a managing network with managed networks. Many forms of managed networks, such as a NaaS, provide various deployment models to Mobile Service Operator (MSO) needs. Such networks may potentially be deployed as dedicated networks, each with one or more network functions (NFs) implemented as part of network slices. Each network for a NaaS may have its own Public Land Mobile Network (PLMN) identifier (ID), as well as its own set of subscribers with their own mobile devices (e.g., smart phones).

Today, there are only a limited number of standard ways for a managing network to share a UDR with managed networks. For example, 5G standards specify a way for a 5G network to share different mobile device users' data on a UDR for different PLMNs, or share policy data on a UDR, such as Access and Mobility Function (AMF) policy data, for different PLMNs. However, there is no standard mechanism for sharing a UDR on the managing network to store or access User Equipment device (UE) policies for different PLMNs or application-triggered policies for different PLMNs. For example, different Policy Control Functions on different managed networks may need to store/access different policies per PLMN for different types of applications, such as gaming applications or vehicle applications. Without UDR-sharing mechanisms, a managing network may be forced to create individual UDRs in the managed networks, leading to increased complexity in network designs and maintenance costs.

Figure 1A:
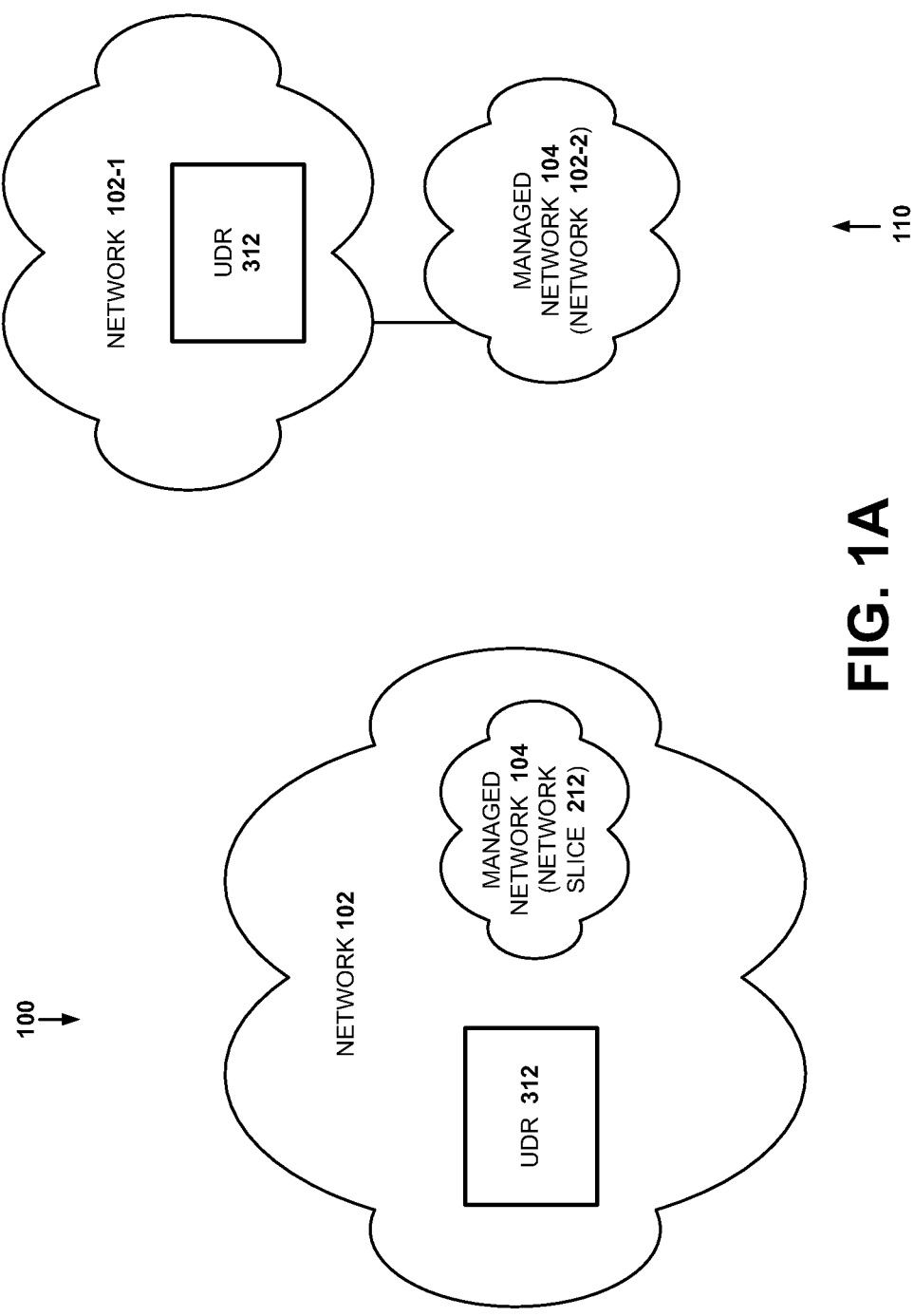
FIGS. 1A and 1B show different network configurations for sharing a Unified Data Repository (UDR) with managed networks.
Figure 1B:
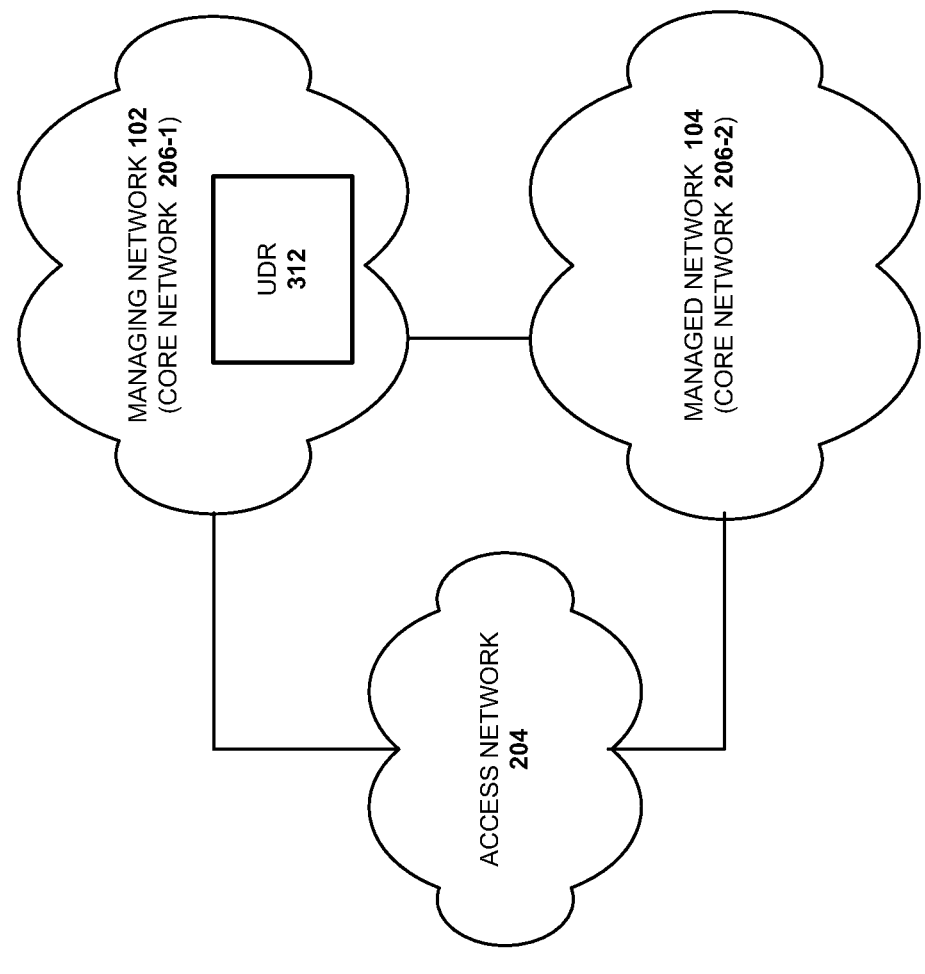
Figure 1B:

FIGS. 1A and 1B show different network configurations in which systems for sharing UDR may be implemented. In a configuration 100, managing network 102 includes a managed network 104 and a UDR 312. In one implementation, managed network 104 is in the form of a network slice 212. Rather than installing a UDR 312 in network slice 212, which includes data that network slice 212 is to use, managing network 102 stores and/or retrieves different data for different network slices 212 in UDR 312 in managing network 102. In a configuration 110, managing network 102 includes UDR 312 but does not include managed network 102-2. Rather, managing network 102-1 and managed network 102-2 may be coupled to one another by backhaul links. In configuration 120, shown in FIG. 1B, managing network 102 and managed network 104 are implemented as core networks 206-1 and 206-2 in Multi-Operator Core Network (MOCN). As shown, core network 206-1 may include UDR 312 that stores data for managed core network 206-2. In each of configurations 100-120, the managing network includes UDR 312 that stores data for the managed networks. The centralization of UDR 312 in each of configurations 100-120 facilitates administration of data, without having to store such data in multiple UDRs within the managed networks and without having to individually modify applications and network functions in each managed networks to access such data from within the managed networks.

FIG. 2 illustrates an exemplary network environment 200 in which the systems and methods for sharing UDR 312 with managed networks may be implemented. In FIG. 2 and other figures, although network 102 is depicted in configuration 100, the following descriptions also apply to other network configurations, including configurations 110 and 120. As shown, network environment 200 may include User Equipment devices (UEs) 202-1 through 202-N(collectively referred to as UEs 202 and generically referred to as UE 202) access network 204, a core network 206, and data networks (DN) 208-1 through 208-T (collectively referred to as data networks 208 and generically as data network 208). Access network 204, core network 206, and data networks 208 may be part of managing network 102.

UEs 202 may include wireless communication devices capable of cellular communication, such as Fourth Generation (4G) (e.g., Long-Term Evolution (LTE)) communication and/or 5G New Radio (NR) communication. Examples of UE 202 include: a Fixed Wireless Access (FWA) device; a Customer Premises Equipment (CPE) device with 5G NR capability; a smart phone; a tablet device; a wearable computer device (e.g., a smart watch); a global positioning system (GPS) device; a laptop computer; a media playing device; a portable gaming system; an autonomous vehicle navigation system; a sensor, such as a pressure sensor; and an Internet-of-Things (IoT) device. In some implementations, UE 202 may correspond to a wireless Machine-Type-Communication (MTC) device that communicates with other devices over a machine-to-machine (M2M) interface, such as LTE-M or Category M1 (CAT-M1) devices and Narrow Band (NB)-IoT devices.

Access network 204 may allow UE 202 to access core network 206. To do so, access network 204 may establish and maintain, with participation from UE 202, an over-the-air channel with the customer devices; and maintain backhaul channels with core network 206. Access network 204 may relay information through such channels, from UEs 202 to core network 206 and vice versa. Access network 204 may include an LTE radio network and/or a 5G NR network, or another advanced radio network. These networks may include many central units (CUs), distributed units (DUs), radio units (RUS), and wireless stations, some of which are illustrated in FIG. 2 as CU/DU/RUs 210 (also referred to as access station 210) for establishing and maintaining over-the-air channel with UEs 202. In some implementations, access station 210 may include a 4G, 5G, or another type of base station (e.g., eNB, gNB, etc.) that comprises one or more radio frequency (RF) transceivers. In some implementations, access station 210 may be part of an evolved Universal Mobile Telecommunications Service (UMTS) Terrestrial Radio Access Network (eUTRAN).

Core network 206 may include one or more devices and network components for rendering communication services to UEs 202. For example, core network 206 may permit UEs 202 to attach to network 102, establish sessions with devices in network 102, and/or receive services from network 102 (e.g., receive content, access the Internet, conduct video conferences with other UEs 202 attached to network 102). To deliver various services, core network 206 may interface with other networks, such as data networks 208. Core network 206 may be associated with a PLMN ID. If network 102 includes more than one core network 206, each such core network 206 may be associated with a unique PLMN ID.

As further shown, core networks 206 may each include one or more network slices 212. Depending on the embodiment, network slices 212 may be implemented within other networks, such as access network 204 and/or data network 208. Access network 204, core networks 206, and data networks 208 may include multiple instances of network slice 212 (collectively referred to as network slices 212). Each network slice 212 may be instantiated as a result of "network slicing," which involves a form of virtual network architecture that enables multiple logical networks to be implemented on top of a shared physical network infrastructure using software defined networking (SDN) and/or network function virtualization (NFV). Each logical network, referred to as a "network slice," may encompass an end-to-end virtual network with dedicated storage and/or computational resources that include access network components, clouds, transport, Central Processing Unit (CPU) cycles, memory, etc. Furthermore, each network slice 212 may be configured to meet a different set of requirements and may be associated with a particular QoS class, a type of service, 5G QoS Identifier (5QI), and/or a particular group of enterprise customers associated with communication devices. Network slices 212 may be capable of supporting enhanced Mobile Broadband (eMBB) traffic, Ultra Reliable Low Latency Communication (URLLC) traffic, Time Sensitive Network (TSN) traffic, Massive IoT (MIOT) traffic, Vehicle-to-Everything (V2X) traffic, High performance Machine Type Communication (HMTC) traffic, and other customized traffic, for example.

Each network slice 212 may be associated with an identifier, herein referred to as a Single Network Slice Selection Assistance Information (S-NSSAI) and/or a network slice instance ID. Each UE 202 that is configured to access a particular network slice 212 may be associated with corresponding data, stored in core network 206 for example, which includes the S-NSSAI that identifies the network slice 212. In implementations where a network slice 212 may be treated as a managed network or a PLMN (e.g., in NaaS), each network slice 212 may be associated with its own unique PLMN ID. Furthermore, such network slice 212 may include one or more core network functions.

Data networks 208 may include one or more networks connected to core networks 206. In some implementations, a particular data network 208 may be associated with a data network name (DNN) in 5G and/or an Access Point Name (APN) in 4G. UE 202 may request a connection to data network 208 using a DNN or APN. Each data network 208 may include, and/or be connected to and enable communications with a local area network (LAN), a wide area network (WAN), a metropolitan area network (MAN), an autonomous system (AS) on the Internet, an optical network, a cable television network, a satellite network, another wireless network (e.g., a Code Division Multiple Access (CDMA) network, a general packet radio service (GPRS) network, and/or an LTE network), an ad hoc network, a telephone network (e.g., the Public Switched Telephone Network (PSTN) or a cellular network), an intranet, or a combination of networks. Data network 208 may include an application server (also referred to as application). An application may provide services for a program or an application running on UEs 202 and may establish communication sessions with UEs 202 via core network 206.

For clarity, FIG. 2 does not show all components that may be included in network environment 200 (e.g., routers, bridges, wireless access point, additional networks, additional access stations 210, data centers, portals, etc.). Depending on the implementation, network environment 200 may include additional, fewer, different, or a different arrangement of components than those illustrated in FIG. 2. Furthermore, in different implementations, the configuration of network environment 200 may be different.

Figure 3A:
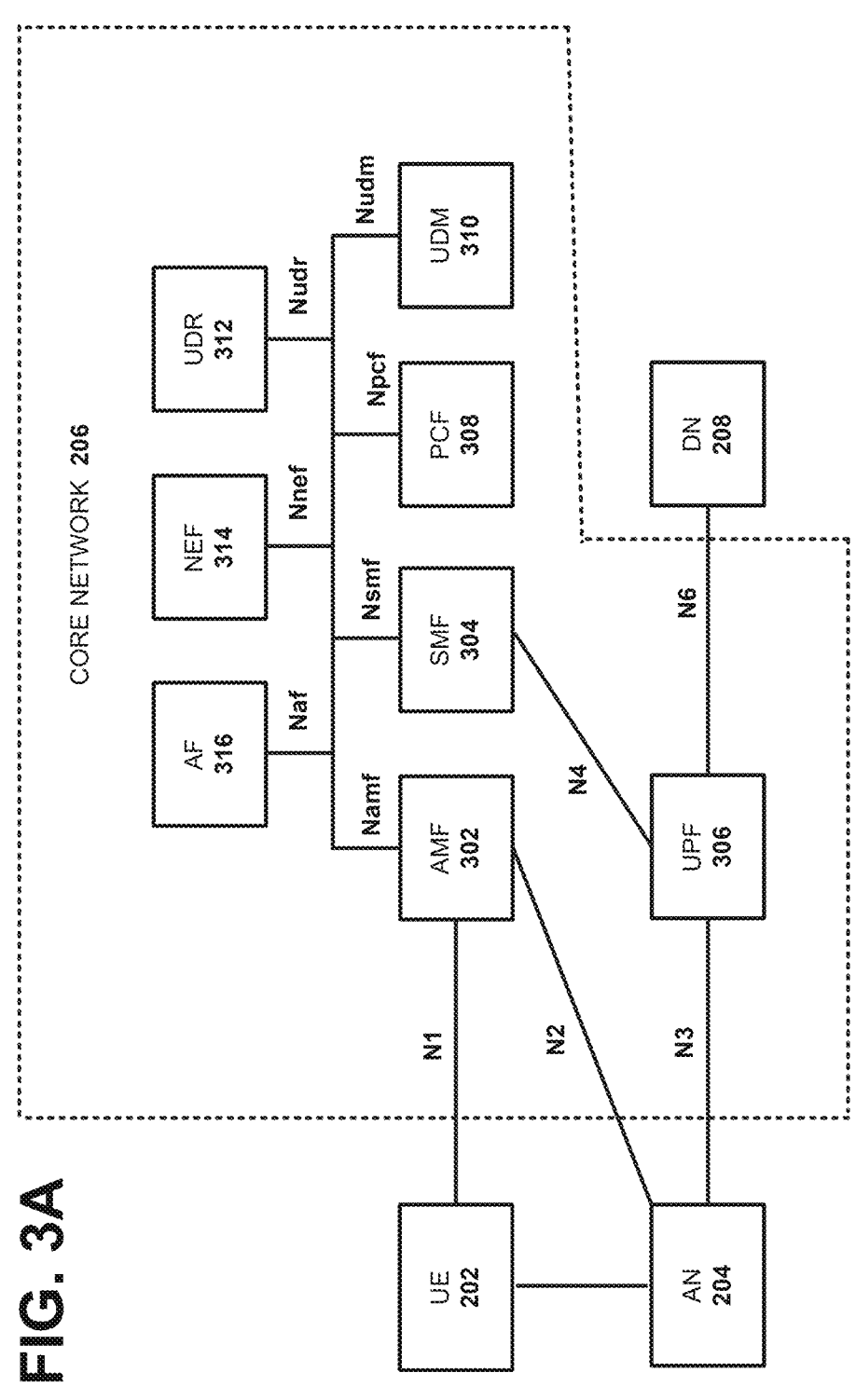
FIG. 3A depicts exemplary components of a core network in a managing network, according to an implementation.

FIG. 3A depicts exemplary components of core network 206 in managing network 102 according to an implementation. As shown, core network 206 may include Access and Mobility Management Function (AMF) 302, a Session Management Function (SMF) 304, a User Plane Function (UPF) 306, a Policy Control Function (PCF) 308, a Unified Data Management (UDM) 310, a Unified Data Repository (UDR) 312, a Network Exposure Function (NEF) 314, and an Application Function (AF) 316. Although core network 206 is depicted as including network components 302-316, in other implementations, core network 206 may include additional, fewer, and/or different 5G core network components than those illustrated in FIG. 3. For example, core network 206 may further comprise Authentication Server Function (AUSF), a Charging Function (CHE), and a Network Slice Selection Function (NSSF).

AMF 302 may perform registration management, connection management, reachability management, mobility management, lawful intercepts, Short Message Service (SMS) transport between UE 202 and a Short Message Service Function (SMSF), session management messages transport between UE 202 and SMF 304, access authentication and authorization, location services management, functionality to support non-Third Generation Partnership Program (3GPP) access networks, and/or other types of management processes. Other network functions may communicate with AMF 302 over the Namf interface. In addition, AMF 302 may interact with UE 202 and access network 204 (implemented as a RAN 204 in FIG. 3) over N1 and N2 interfaces, respectively.

SMF 304 may perform session establishment, session modification, and/or session release, perform Internet Protocol (IP) address allocation and management, perform Dynamic Host Configuration Protocol (DHCP) functions, perform selection and control of UPF 306, configure traffic steering at UPF 306 to guide the traffic to the correct destinations, terminate interfaces toward PCF 308, perform lawful intercepts, charge data collection, support charging interfaces, control and coordinate of charging data collection, terminate session management parts of Non-Access Stratum (NAS) messages, perform downlink data notification, manage roaming functionality, and/or perform other types of control plane processes for managing user plane data. Other network functions or components may communicate with SMF 304 over the Nsmf interface.

UPF 306 may maintain an anchor point for intra/inter-RAT mobility, maintain an external protocol data unit (PDU) point of interconnect to a particular data network (e.g., data network 208), perform packet routing and forwarding, perform the user plane part of policy rule enforcement, perform packet inspection, perform lawful intercept, perform traffic usage reporting, perform Quality of Service (QOS) handling in the user plane, perform uplink traffic verification, perform transport level packet marking, perform downlink packet buffering, forward an "end marker" to a RAN node (e.g., gNB), and/or perform other types of user plane processes. UPF 306 may interact with RAN 204, SMF 304, and data network 208 over N3, N4, and N6 interfaces.

PCF 308 may support policies to control network behavior, provide policy rules to control plane functions (e.g., to SMF 304), access subscription information relevant to policy decisions, perform policy decisions, and/or perform other types of processes associated with policy enforcement. Other network functions may communicate with PCF 308 over the Npcf interface.

UDM 310 may maintain subscription information for UEs 202, manage subscriptions, generate authentication credentials, handle user identification, perform access authorization based on subscription data, perform network function registration management, maintain service and/or session continuity by maintaining assignment of SMF 304 for ongoing sessions, support SMS delivery, support lawful intercept functionality, and/or perform other processes associated with managing user data. UDM 310 may store the data that it manages in UDR 312. Network functions may interact with UDM 310 via the Nudm interface.

UDR 312 may store subscription data/profiles, policy data, application data, and exposure data, for both managing network 102 and managed networks 104. The subscription data may include information that is associated with the subscribers of managing and managed networks 102 and/or 104. The subscription data may be made available to other NFs via UDM 310. The policy data may include policy rules and parameters associated with the policy rules. PCFs 308 in both managing network 102 and managed networks 104 may access the policy data in UDR 312. The application data may comprise information and/or data collected by applications and/or AFs 316 in managing network 102 and managed networks 104. If applications and/or AFs 316 are external to the core network 206 in which UDR 312 resides, the applications and/or AFs 316 may place the application data at UDR 312 via NEF 314. The exposure data may relate to data associated with NEF 314. The application data and policy data on IDR 312 are described below in greater detail with reference to FIGS. 5A and 5B.

NEF 314 may expose network component capabilities and events internal to corresponding core network 206 and/or data networks 208 to devices and network functions external to core network 206. Network functions may interact with NEF 314 via the Nnef interface. AF 316 may include applications (e.g., server applications) that render specific services to applications or components that run on UEs 202. Network functions may interact with AF 316 via the Naf interface.

Figure 3B:
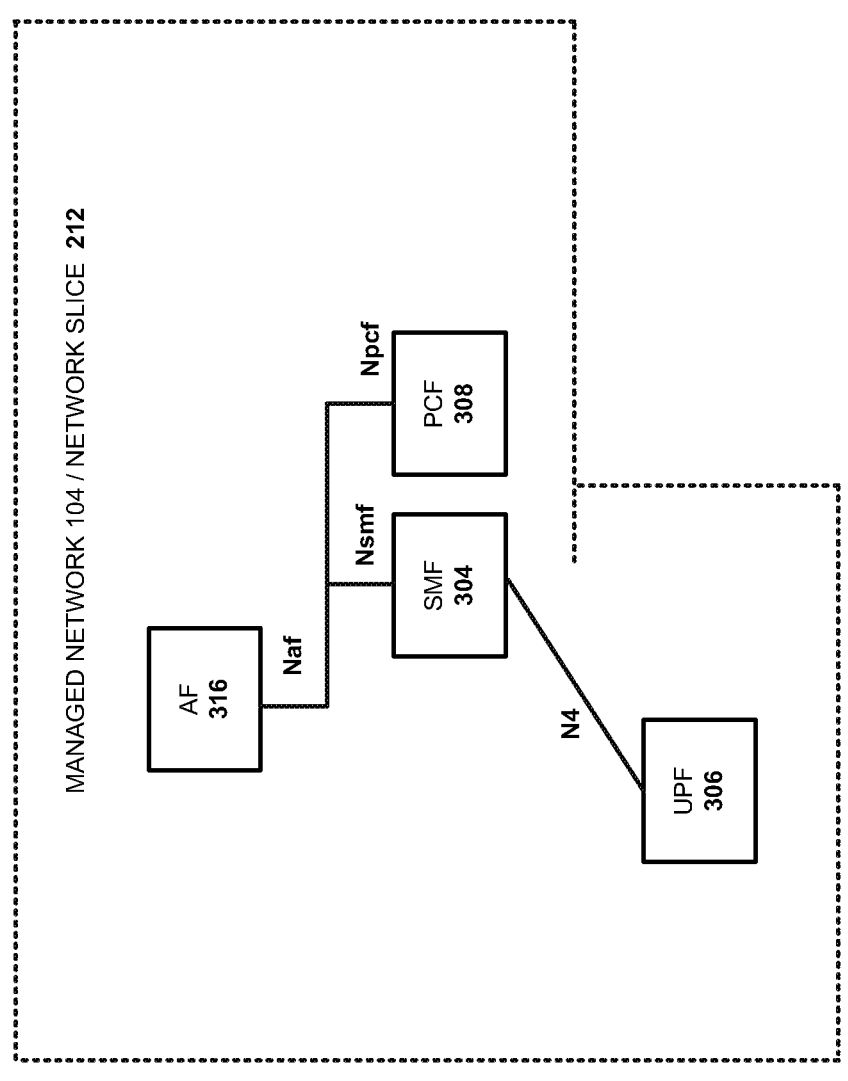
FIG. 3B depicts exemplary components of a managed network when the managed network is implemented as a network slice.

FIG. 3B depicts exemplary components of managed network 104, according to an implementation. In FIG. 3B, managed network 104 is embodied as a network slice 212, although as indicated in the descriptions above for FIGS. 1A-1C, other embodiments are possible. Depending on the embodiment, managed network 104 may comprise other core network components of network 102. As shown, network slice 212 includes SMF 304, UPF 306, PCF 308, and AF 316. These NFs may operate similarly as those in FIG. 3A, except that much of their activities are performed in the context of network slice 212 in which they are hosted.

As part of managed network 104, some components of network slice 212 may access UDR 312 within core network 206 of managing network 102. For example, PCF 308 in network slice 212 may access UDR 312 located in managing network 102 via NEF 314, to store or access policies. Similarly, AF 316 may store, retrieve, delete, or modify application data at UDF 312, via NEF 314, in managing network 102.

Figure 4:
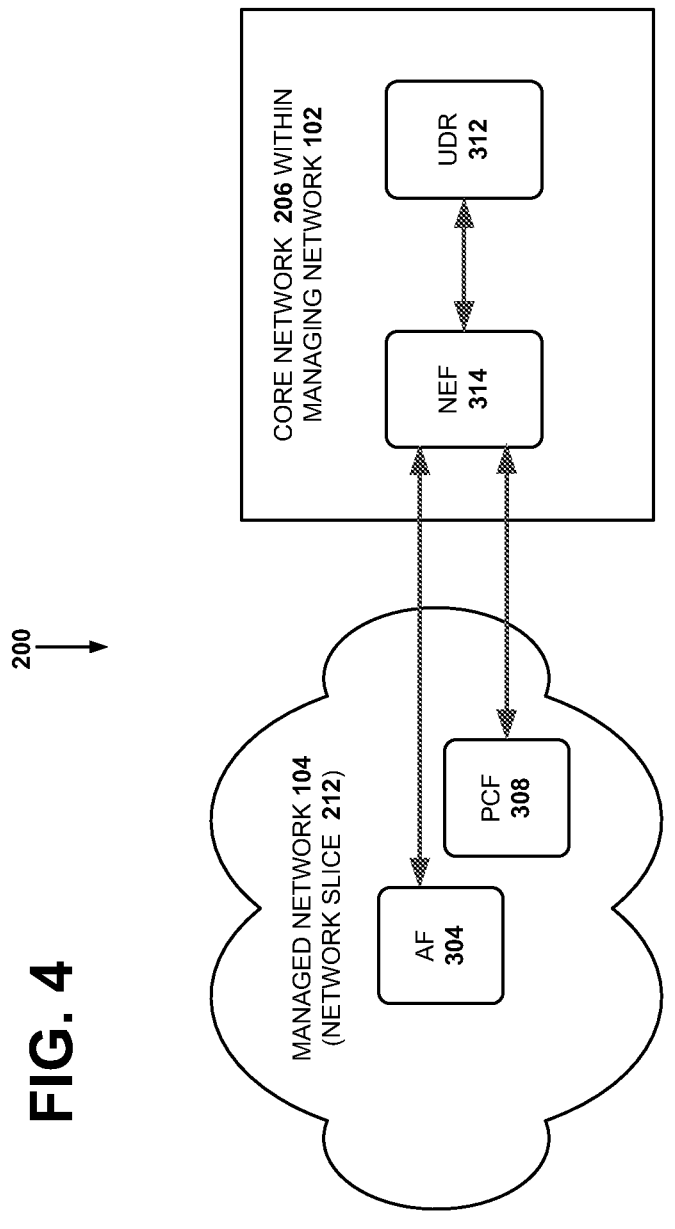
FIG. 4 shows an exemplary communications between a managing network and a managed network when the managed network is implemented as a network slice.

FIG. 4 shows an exemplary communications between managing network 102 and a managed network 104 when the managed network 104 is implemented as a network slice 212. In FIG. 4, managed network 104 is depicted as including PCF 308 and AF 316; and core network 206 in managing network 102 is depicted as including UDR 312 and NEF 314. Because PCF 308 and AF 316 are in managed network 104, they are external to managing network 102 and hence need to access UDR 312 via NEF 314 (e.g., use NEF 314 to store, retrieve, or delete data at UDR 312).

In a standard implementation of UDR 312, UDR 312 does not allow at least some data from PCF 308 and AF 316 to be stored at UDR 312 based on the PLMN ID of network slice 212 hosting PCF 308 and AF 316. Therefore, for example, if two instances of PCF 308 (or AF 316) in two network slices 212 with different PLMN IDs request UDR 312 to store their data, UDR 312 may be unable to store their data separately based on their PLMN IDs. Each PCF 308 and AF 316 whose data needs to be isolated from data of other PCFs 308 AFs 316 may be unable to use UDR 312 within managing network 102. More generally, NFs in each network slice 212 that has its own PLMN ID may be unable to share UDR 312 in managing network 102 with other NFs in other managed networks 104.

In contrast, in the embodiment of FIG. 4, UDR 312 is configured to store policy data and application data at UDR 312 based on PLMN ID of the managed network 104 in which PCF 308 and AF 316 reside. For example, when AF 316 forwards data to UDR 312 via NEF 314, UDR 312 may store the application data for the AF 316 under the PLMN ID of network slice 212. UDR 312 may behave similarly for PCF 308. More generally, NFs of different managed networks 104 may share UDR 316 in managing network 102.

Figure 5B:
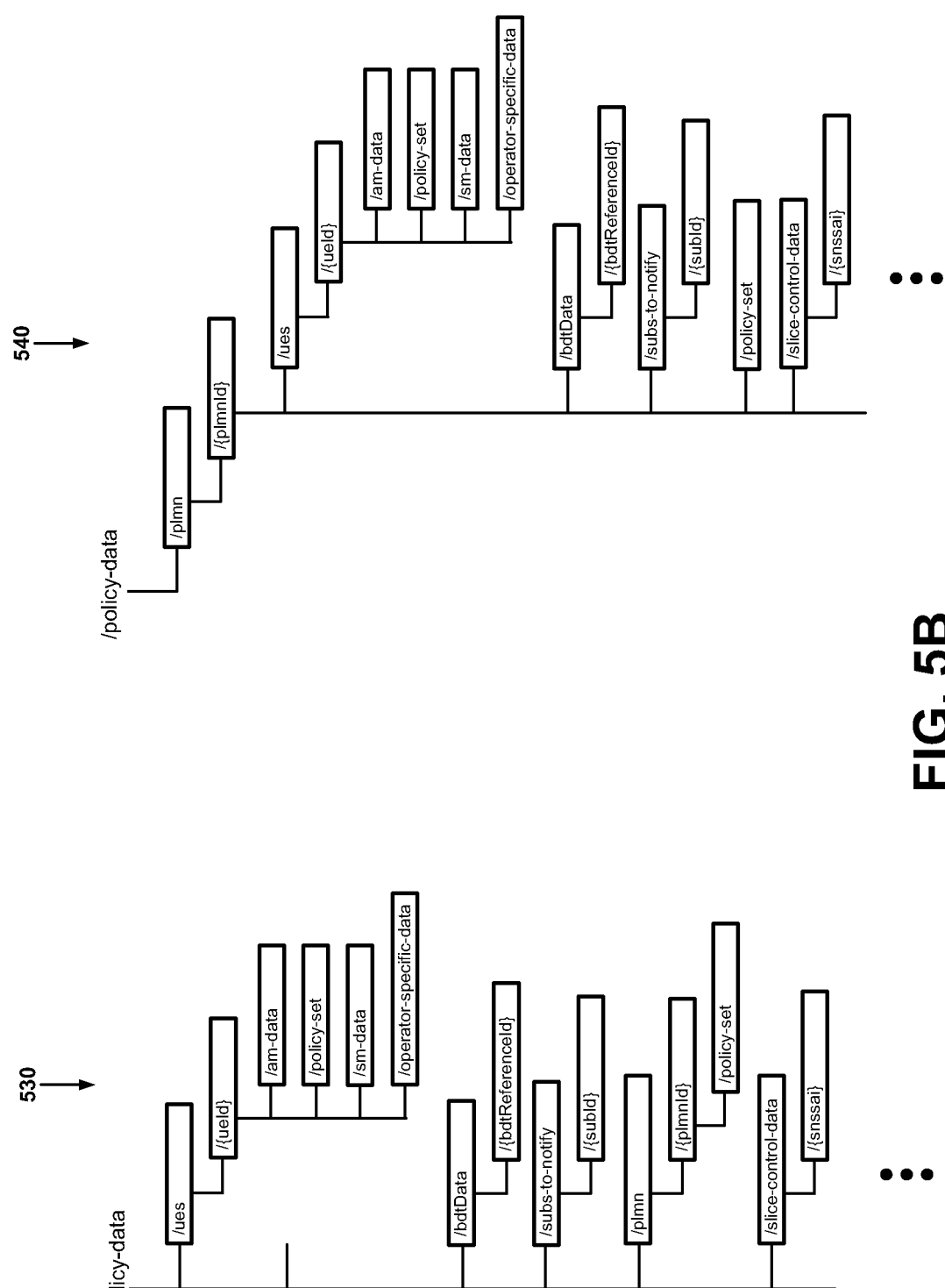

FIGS. 5A and 5B illustrate example modifications to UDR 312 for sharing UDR 312 with managed networks 104, according to an implementation. In FIGS. 5A and 5B, UDR 312 may include a number of nodes that represent resources (e.g., a network folder, a mount point, a drive, etc.). The nodes are arranged as a tree-like data structure (simply referred to as a tree). Each node may be analogous to a folder, a directory or a mount point. Each node or a resource is associated with a name, such as a Universal Resource Identifier (URI). If a node branches off from another node (referred to as a parent), the branching off node may be referred to as a child node or a child. A parent node comprises its child nodes. PCFs 308 and AFs 316 in managed networks 104 may access the resources corresponding to the nodes of UDR 312 in managing network 102. More specifically, such PCFs 308 and AFs 316 may create, delete, access, and update the data, by invoking Hypertext Transfer Protocol (HTTP) PUT, DELETE, GET, and PATCH calls, with the name of the node (i.e., URI) and the data as arguments of the invocation, sometimes along with the PLMN ID of the managed network 104.

Referring to FIG. 5A, according to a standard implementation, UDR 312 may include an application data node 510, which in turn may comprise a pfds (packet flow descriptor) node, an influenceData node, an IPTVconfigData node, a bdtPolicyData node, an am-influenceData node, and a subs-to-notify node. Depending on the implementation, application data node 510 may include additional, fewer, or different child nodes than those shown in FIG. 5A. The pfds node may comprise packet flow data (PFD) for each application corresponding to an appId (application ID) node. The influenceData node may include information for influencing network traffic by a set of network functions. The information may comprise, per influenceData set, an influenceId and IDs of NFs that are to be notified. The IPTVconfigData node may include IPTV configuration information per configuration. The bdtPolicyData node may include policy information for background data transfer, per policy (identified by bdtpolicyId). The am-influence-data may comprise data that is associated with influencing AMF 302 per am-influence (identified by am-influenceId). The subs-to-notify node may include identities (or network addresses) of subscriber NFs of UDR 312 to be notified when data under application node 510 changes.

In an embodiment where UDR 312 is shared by managed networks 104, the UDR 312 may include modified application data node 520 in lieu of or in addition to application data node 510. As shown, modified application node 520 may include a plmn node that comprises data for different plmnId's. Each plmnId node may comprise all of the child nodes of application data node 510. Accordingly, when AF 316 is to store information in UDR 312 that is shared by managed networks 104, AF 316 may provide a PLMN ID and the information corresponding to the node under application node 510. The shared UDR 312 may then store the information under the corresponding node under the plmnId node identified by the PLMN ID.

Referring to FIG. 5B, according to a standard implementation, UDR 312 may include a policy data node 530, which in turn may comprise a ues node, a bdtData node, a subs-to-notify node, a plmn node, and a slice-control-data node. Depending on the implementation, policy data node 530 may include additional, fewer, or different child nodes than those shown in FIG. 5B. The ues node may comprise policy data pertaining to individual UEs 202. For each UE ID (under a ueId node under the ues node), Access and Mobility function (AMF) data (under the am-data node), a policy set for the particular UE (under the policy-set node), Session Management function (SMF) data (under sm-data), and operator data (under the operator-specific-data node). The bdtData may include policy data for background data transfer per a particular bdt (under the bdtReferenceId node). The subs-to-notify node may identify NFs subscribed to the UDR 312. The NFs may be identified by the subId nodes under the subs-to-identify node. The plmn node may include policies per PLMN ID. The slice-control-data may network slices and may include S-NSSAIs (under the snssai nodes).

In an embodiment where UDR 312 is shared by managed networks 104, the UDR 312 may include modified policy data node 540. As shown, modified policy data node 540 may include a plmn node that comprises data for different PLMN IDs (under the plmnId nodes). Each plmnId node may comprise all of the child nodes of policy data node 530. Accordingly, if a PCF 308 is to store or access information in UDR 312 that is shared by managed networks 104, PCF 308 may provide a PLMN ID and the information corresponding to the node under policy data node 530. The shared UDR 312 may then store or access the information under the corresponding plmnId node.

Figures 6A, 6B:
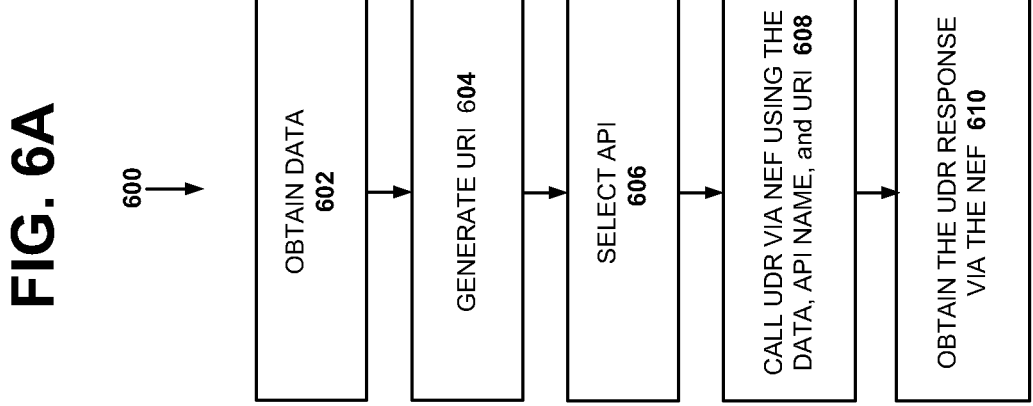
FIGS. 6A and 6B show flow diagrams of exemplary processes that are associated with a system for sharing a UDR with managed networks, according to an implementation.

FIGS. 6A and 6B show flow diagrams of an exemplary processes 600 and 620 that are associated with a system for sharing UDR 312 with managed networks 104, according to an implementation. Processes 600 and 620 may be performed by various NFs, such as NFs 302-316 in managing network 102 and in managed networks 104. Process 600 may be performed by an NF to store or update data at UDR 312; and process 620 may be performed by an NF to access stored data at UDR 312.

Referring to FIG. 6A, process 600 may include an NF, which is hosted in a managed network 104, preparing or obtaining data to be stored or updated at UDR 312 in managing network 102 (block 602). For example, AF 316 may obtain packet flow data (PFD) for storage on UDR 312. Next, to store the data, the NF may determine the URI of the node (on URI 312) at which the data is to be stored (block 604). Details of the process for obtaining the URI are described below with reference to FIG. 6C.

Process 600 may further include selecting or identifying the Application Programming Interface (API) call (block 606), depending on whether the NF is to place new data or update the data (e.g., HTTP PUT or HTTP PATCH). Having selected the API (e.g., identify the name of the API) for UDR 312, the NF may then use the data, the API name, and the URI of the UDR node at which the data is to be stored to make a call to NEF 314, which then calls UDR 312 using the API, the data, and the URI. That is, the NF calls UDR 312 via NEF 314, using the data, the API name, and the URI (block 608). When NEF 314 receives a response to the API call to UDR 312, NEF 312 may then pass the response to the NF—the NF may receive the UDR response via NEF 314 (block 610).

Referring to FIG. 6B, process 620 may include an NF, which is hosted in a managed network 104, identifying data to be accessed from UDR 312 in managing network 102 (block 622). For example, an NF may determine that it needs PFD data from UDR 312. Next, to access the data, the NF may determine the URI of the node (in URI 312) from which the data is to be accessed or deleted (block 624). Details of the process for obtaining the URI is as same as those for block 604, described below with reference to FIG. 6C.

Process 620 may further include selecting or identifying the API call (block 626). (e.g., HTTP DELETE or HTTP GET). Having selected the API (e.g., identify the name of the API) for UDR 312, the NF may then use the API name and the URI of the UDR node from which the data is to be retrieved or deleted to make a call to NEF 314, which then calls UDR 312 using the API and the URI. That is, the NF may call UDR 312 via NEF 314, using the API name and the URI (block 628). When NEF 314 receives a response to the API call to UDR 312 (e.g., the data or an indication that the data was successfully removed from the node at UDR 312), NEF 314 may then pass the response to the NF—the NF may receive the UDR response via NEF 314 (block 630).

Figure 6C:
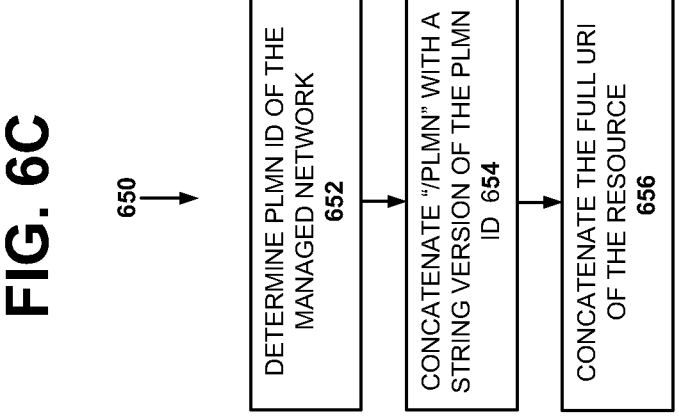
FIG. 6C is a flow diagram of an exemplary process that is associated with generating a Universal Resource Identifier (URI) of a node, on a UDR, at which data is to be stored, updated, accessed, or removed, according to an implementation.

FIG. 6C is a flow diagram of a process 650 that is associated with generating a URI of a UDR node at which data is to be stored, updated, accessed, or removed. As shown, process 650 may include an NF determining or retrieving the PLMN ID of managed network 104 in which NF is hosted (block 652). For example, AF 316 may determine the PLMN ID that is assigned to the network slice 212 to render a NaaS.

Process 650 may further include the NF storing a string, obtained by concatenating "/plmn" with a string version of the PLMN ID, at a memory location (block 654). Next, the NF may obtain a URI of the node at which the data would be stored, accessed or removed if the node were on a UDR 312 that is not shared by managed networks 104. The NF may then concatenate the string stored at the memory location with the obtained URI, to generate the URI to access the node at the UDR 312 shared by managed networks 104 (block 656).

Figure 7:
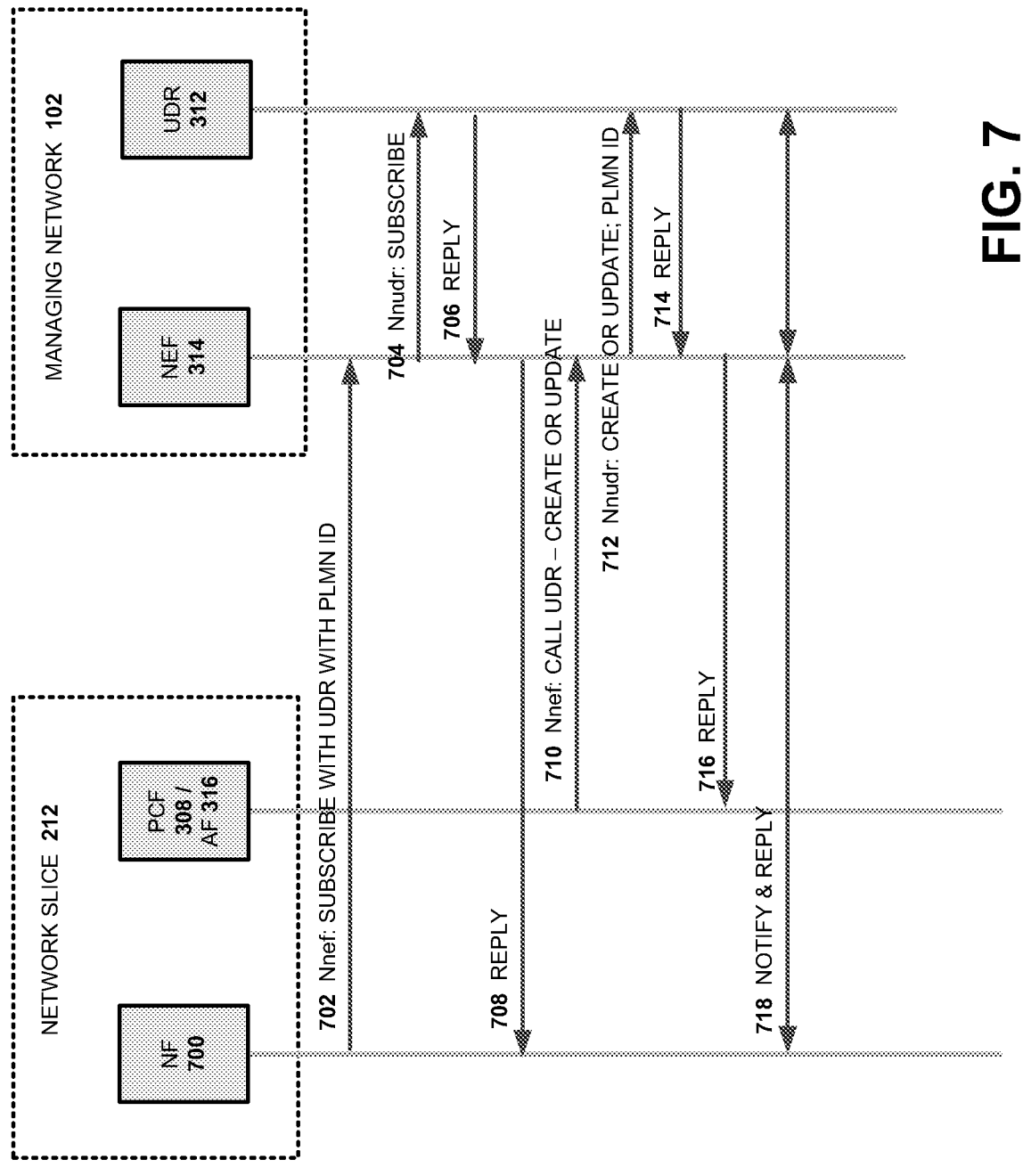
FIG. 7 illustrates exemplary messages that are exchanged by components of a managed network and a managing network, according to an implementation.

FIG. 7 illustrates exemplary messages that are exchanged by components of a managed network 104 and a managing network 102, according to an implementation. In FIG. 7, managed network 104 is implemented as a network slice 212 and may include an NF 700 and PCF 308 or AF 316; and managing network 102 may include UDR 312 and NEF 314. The messaging may include NF 700 sending a message to NEF 314 to relay a request to subscribe to UDR 312 (arrow 702). The message may include or convey the PLMN ID of network slice 212. In response, NEF 314 may forward the request to UDR 312 (arrow 704). Like call 702, the call 704 may include the PLMN ID of network slice 212. When UDR 312 receive the request via NEF 314, UDR 312 may place the ID of NF 700 on its list of subscriber NFs for a particular resource (data at a particular node at UDR 312). The ID for NF 700 may be placed under either/plmn/{plmnId/application-data or/policy-data or/plmn/}plmnId}/policy-data (see FIGS. 5A and 5B). After the subscription, UDR 312 may send a reply message to NEF 314 (arrow 706), which may then forward the reply to NF 700 (arrow 708).

The messaging may further include PCF 308/AF 316 sending a message to update or create (store) data at UDR 312 to NEF 314 (arrow 710). The call may include the data but not necessarily the PLMN ID, since the URI for the data already includes the PLMN ID. NEF 314 may then relay the update/create request, along with the data, to UDR 312 (arrow 712). When UDR 312 writes the data at the location specified by the URI in the request (e.g., under the/plmn/}PLMN ID} directory), UDR 312 may send a reply message to NEF 314 (arrow 714). NEF 314 may then forward the reply from UDR 312 to PCF 308/AF 316 (arrow 716).

When UDR 312 updates/creates the data at the specified URI, UDR 312 may also look up a list of NFs that are subscribed with UDR 312 to be notified of any changes or creation of data at the URI. When UDR 312 determines that NF 700 is a subscriber for the data, UDR 312 may notify NF 700 via NEF 314 (arrows 718).

Figure 8:
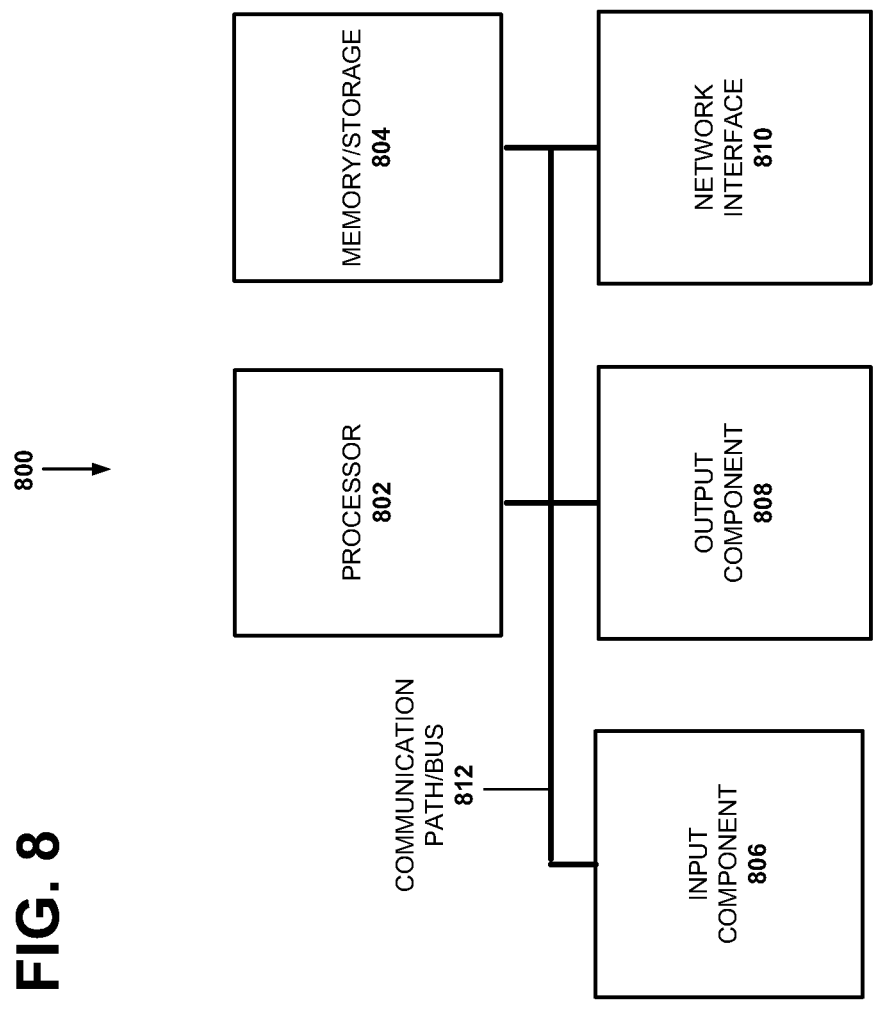
FIG. 8 depicts exemplary functional components of a network device according to an implementation.

FIG. 8 depicts exemplary components of a network device 800. Network device 800 may correspond to or be included in any of the devices and/or components illustrated in FIGS. 1A, 1B, 2, 3A, 3B, 4, AND 7 (e.g., managing network 102, managed network 104, UE 202, access network 204, core network 206, data network 208, access station 210, and NFs 302-316). In some implementations, network devices 800 may be part of a hardware network layer on top of which other network layers and NFs may be implemented.

As shown, network device 800 may include a processor 802, memory/storage 804, input component 806, output component 808, network interface 810, and communication path 812. In different implementations, network device 800 may include additional, fewer, different, or different arrangement of components than the ones illustrated in FIG. 8. For example, network device 800 may include line cards, switch fabrics, modems, etc.

Processor 802 may include a processor, a microprocessor, an Application Specific Integrated Circuit (ASIC), a Field Programmable Gate Array (FPGA), programmable logic device, chipset, application specific instruction-set processor (ASIP), system-on-chip (SoC), central processing unit (CPU) (e.g., one or multiple cores), microcontrollers, and/or other processing logic (e.g., embedded devices) capable of controlling network device 800 and/or executing programs/instructions.

Memory/storage 804 may include static memory, such as read only memory (ROM), and/or dynamic memory, such as random access memory (RAM), or onboard cache, for storing data and machine-readable instructions (e.g., programs, scripts, etc.). Memory/storage 804 may also include a CD ROM, CD read/write (R/W) disk, optical disk, magnetic disk, solid state disk, holographic versatile disk (HVD), digital versatile disk (DVD), and/or flash memory, as well as other types of storage device (e.g., Micro-Electromechanical system (MEMS)-based storage medium) for storing data and/or machine-readable instructions (e.g., a program, script, etc.). Memory/storage 804 may be external to and/or removable from network device 800. Memory/storage 804 may include, for example, a Universal Serial Bus (USB) memory stick, a dongle, a hard disk, off-line storage, a Blu-Ray® disk (BD), etc. Memory/storage 804 may also include devices that can function both as a RAM-like component or persistent storage, such as Intel® Optane memories.

Depending on the context, the term "memory," "storage," "storage device," "storage unit," and/or "medium" may be used interchangeably. For example, a "computer-readable storage device" or "computer-readable medium" may refer to both a memory and/or storage device.

Input component 806 and output component 808 may provide input and output from/to a user to/from network device 800. Input/output components 806 and 808 may include a display screen, a keyboard, a mouse, a speaker, a microphone, a camera, a DVD reader, USB lines, and/or other types of components for obtaining, from physical events or phenomena, to and/or from signals that pertain to network device 800.

Network interface 810 may include a transceiver (e.g., a transmitter and a receiver) for network device 810 to communicate with other devices and/or systems. For example, via network interface 810, network device 800 may communicate over a network, such as the Internet, an intranet, cellular, a terrestrial wireless network (e.g., a WLAN, WIFI, WIMAX, etc.), a satellite-based network, optical network, etc. Network interface 810 may include a modem, an Ethernet interface to a LAN, and/or an interface/connection for connecting network device 800 to other devices (e.g., a Bluetooth interface).

Communication path or bus 812 may provide an interface through which components of network device 800 can communicate with one another.

Network device 800 may perform the operations described herein in response to processor 802 executing software instructions stored in a non-transient computer-readable medium, such as memory/storage 804. The software instructions may be read into memory/storage 804 from another computer-readable medium or from another device via network interface 810. The software instructions stored in memory/storage 804, when executed by processor 802, may cause processor 802 to perform one or more of the processes that are described herein.

In this specification, various preferred embodiments have been described with reference to the accompanying drawings. It will be evident that modifications and changes may be made thereto, and additional embodiments may be implemented, without departing from the broader scope of the invention as set forth in the claims that follow. The specification and drawings are accordingly to be regarded in an illustrative rather than restrictive sense.

In the above, while series of actions, messages, and/or signals, have been described with reference to FIGS. 6A-6C, and 7. the order of the actions, messages, and signals may be modified in other implementations. In addition, non-dependent actions, messages, and signals may represent actions, messages, and signals that can be performed, sent, and/or received in parallel and in different orders. Furthermore, each actions, messages, and signals illustrated may include one or more other actions, messages, and/or signals.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, a microprocessor, an application specific integrated circuit, or a field programmable gate array, software, or a combination of hardware and software.

To the extent the aforementioned embodiments collect, store or employ personal information provided by individuals, it should be understood that such information shall be collected, stored, and used in accordance with all applicable laws concerning protection of personal information. The collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, block, or instruction used in the present application should be construed as critical or essential to the implementations described herein unless explicitly described as such. Also, as used herein, the articles "a," "an," and "the" are intended to include one or more items. Further, the phrase "based on" is intended to mean "based, at least in part, on" unless explicitly stated otherwise.

What is claimed is:

1. A Unified Data Repository (UDR) in a first network with a first Public Land Mobile Network (PLMN) identifier (ID), comprising:
    a resource, comprising data at a child node of the resource, with a name that includes a second PLMN ID; and
    one or more processors configured to:
        receive a call, via a Network Exposure Function (NEF) in the first network, from a network function located in a second network with the second PLMN ID;
        access the data; and
        send a response to the call.

2. The UDR of claim 1, wherein the network function includes one of:
    an Application Function (AF); or
    a Policy Control Function (PCF).

3. The UDR of claim 1, wherein the second network comprises one of:
    a network slice hosted within the first network;
    a core network in a Multi-Operator Core Network (MOCN); or
    a cellular network coupled to the first network by a backhaul link.

4. The UDR of claim 1, wherein the first network includes the second network to provide a Network-as-a-Service.

5. The UDR of claim 1, wherein the resource is a child of a first parent, wherein the first parent has a second parent comprising:
    an application-data resource; or
    a policy-data resource.

6. The UDR of claim 1, wherein the first parent has a child with a name corresponding to a third PLMN ID that identifies a third network.

7. The UDR of claim 1, wherein the call includes:
    a Hypertext Transfer Protocol (HTTP) GET;
    an HTTP PUT; or
    an HTTP DELETE.

8. The UDR of claim 1, wherein the call includes at least one of:
    a Universal Resource Identifier (URI) that identifies the child node; or
    data to be stored at the child node.

9. A method comprising:
    storing data at a child node of a resource in a Unified Data Repository (UDR) in a first network with a first Public Land Mobile Network (PLMN) identifier (ID), wherein the resource has a name that includes a second PLMN ID;

receiving a call, via a Network Exposure Function (NEF) in the first network, from a network function located in a second network with the second PLMN ID;

accessing the data; and sending a response to the call.

10. The method of claim 9, wherein the network function includes one of:

an Application Function (AF); or a Policy Control Function (PCF).

11. The method of claim 9, wherein the second network comprises one of:

a network slice hosted within the first network;

a core network in a Multi-Operator Core Network (MOCN); or a cellular network coupled to the first network by a backhaul link.

12. The method of claim 9, wherein the first network includes the second network to provide a Network-as-a-Service.

13. The method of claim 9, wherein the resource is a child of a first parent, wherein the first parent has a second parent comprising:

an application-data resource; or a policy-data source.

14. The method of claim 9, wherein the first parent includes a child with a name corresponding to a third PLMN ID that identifies a third network.

15. The method of claim 9, wherein the call includes:

a Hypertext Transfer Protocol (HTTP) GET;

an HTTP PUT; or an HTTP DELETE.

16. The method of claim 10, wherein the call includes at least one of:

a Universal Resource Identifier (URI) that identifies the child node; or data to be stored at the child node.

17. A non-transitory computer-readable medium comprising processor-executable instructions, which when executed by one or more processors of a device in a network, cause the one or more processors to:

store data at a child node of a resource in a Unified Data Repository (UDR) in a first network with a first Public Land Mobile Network (PLMN) identifier (ID), wherein the resource has a name that includes a second PLMN ID;

receive a call, via a Network Exposure Function (NEF) in the first network, from a network function located in a second network with the second PLMN ID;

access the data; and send a response to the call.

18. The non-transitory computer-readable medium of claim 17, wherein the second network comprises one of:

a network slice hosted within the first network;

a core network in a Multi-Operator Core Network (MOCN); or a cellular network coupled to the first network by a backhaul link.

19. The non-transitory computer-readable medium of claim 18, wherein the network function includes one of:

an Application Function (AF); or a Policy Control Function (PCF).

20. The non-transitory computer-readable medium of claim 17, wherein the first network includes the second network to provide a Network-as-a-Service.

* * * * *